United States Patent
Stenbaek et al.

(10) Patent No.: US 8,747,592 B2
(45) Date of Patent: Jun. 10, 2014

(54) METHOD OF REPAIRING A FIBRE COMPOSITE SOLID MEMBER

(75) Inventors: Knud Nielsen Stenbaek, Skjern (DK); Alex Olesen, Skjern (DK); Henning Schröder, Hvide Sande (DK)

(73) Assignee: Vestas Wind Systems A/S, Aarhus N. (DK)

( * ) Notice: Subject to any disclaimer, the term of this patent is extended or adjusted under 35 U.S.C. 154(b) by 810 days.

(21) Appl. No.: 12/809,760

(22) PCT Filed: Dec. 8, 2008

(86) PCT No.: PCT/DK2008/050300
§ 371 (c)(1),
(2), (4) Date: Nov. 3, 2010

(87) PCT Pub. No.: WO2009/080038
PCT Pub. Date: Jul. 2, 2009

(65) Prior Publication Data
US 2011/0036482 A1  Feb. 17, 2011

Related U.S. Application Data

(60) Provisional application No. 61/008,702, filed on Dec. 21, 2007.

(30) Foreign Application Priority Data

Dec. 21, 2007  (DK) ................................ 2007 01879

(51) Int. Cl.
*B29C 73/04*  (2006.01)

(52) U.S. Cl.
USPC ............ 156/94; 156/285; 156/286; 264/36.1; 264/36.22; 29/402.09; 29/402.11

(58) Field of Classification Search
USPC ........... 156/94, 285–287, 381, 382; 264/36.1, 264/36.22; 29/402.09, 402.11
See application file for complete search history.

(56) References Cited

U.S. PATENT DOCUMENTS

| 4,824,500 A | 4/1989 | White et al. |
| 5,023,987 A | 6/1991 | Wuepper et al. |

(Continued)

FOREIGN PATENT DOCUMENTS

EP  1 683 627  7/2006

OTHER PUBLICATIONS

Sam Dastin; Repairing Advanced Composite Materials; Feb. 20, 1986; 5 pages; Advanced Composite, Grumman Corp., Bethpage, NY.

(Continued)

*Primary Examiner* — Christopher Schatz
(74) *Attorney, Agent, or Firm* — Wood, Herron & Evans, LLP

(57) ABSTRACT

The present invention relates to a method of repairing a fiber composite solid member having a locally deteriorated surface area, such as having cracks or creases. The solid member may e.g. be a mold for the manufacturing of wind turbine blades or such blades. The method comprises machining a surface section comprising the locally deteriorated surface area in order to obtain a recess having a predefined depth and circumferential shape, placing a repair patch having a predefined thickness and circumferential shape matching the recess in the recess, and fastening the repair patch to the solid member by use of a binder material. At least some of the elastic and thermal properties of the repair patch and the binder material are so that after fastening, the repair patch and the binder material in combination have elastic and thermal properties which are substantially the same as the corresponding properties of the surface section before machining.

19 Claims, 3 Drawing Sheets

(56) References Cited

U.S. PATENT DOCUMENTS

| | | | |
|---|---|---|---|
| 5,322,665 A * | 6/1994 | Bernardon et al. | 264/571 |
| 5,374,388 A * | 12/1994 | Frailey | 264/510 |
| 5,618,606 A | 4/1997 | Sherrick et al. | |
| 5,958,166 A * | 9/1999 | Walters et al. | 156/94 |
| 2001/0008161 A1 | 7/2001 | Kociemba et al. | |
| 2003/0188821 A1 | 10/2003 | Keller et al. | |
| 2004/0065972 A1* | 4/2004 | Palazzo | 264/36.22 |
| 2005/0184432 A1* | 8/2005 | Mead | 264/272.15 |
| 2006/0059828 A1 | 3/2006 | Stevenson et al. | |
| 2008/0008836 A1* | 1/2008 | Kipp et al. | 427/307 |

OTHER PUBLICATIONS

Walter Eversheim et al; Produktionstechnik Fur Bauteile aus Nichtmetallischen Faserverbundwerkstoffen; Apr. 7, 1998; 4 pages; Ingenieur-Werkstoffe.

Dmitri Burdykin; Examination Report issued in priority Denmark Application No. PA 2007 01879; Jul. 24, 2008; 5 pages; Denmark Patent and Trademark Office.

Dmitri Burdykin; Translation of Examination Report issued in priority Denmark Application No. PA 2007 01879; Jul. 24, 2008; 5 pages; Denmark Patent and Trademark office.

\* cited by examiner

METHOD OF REPAIRING A FIBRE COMPOSITE SOLID MEMBER

FIELD OF THE INVENTION

The present invention relates to a method of repairing a fibre composite solid member and in particular to a method comprising use of a repair patch.

BACKGROUND OF THE INVENTION

Fibre reinforced resin composites are used in the wind turbine industry e.g. for rotor blades. The manufacturing process typically comprises use of a mould to obtain the desired shape of the blades. A known problem is that the mould occasionally gets damaged e.g. due to small surface parts being torn off when a blade is removed from the mould after manufacturing, or due to accidental indents, cracks or scratches obtained during handling of the mould. Since such a mould is typically expensive and takes up much storage space, the number of moulds at a manufacturing site is kept to a minimum, and no or very few spare moulds may be available if some are taken out of the production line for maintenance. A known method of repairing a deteriorated surface area of such a mould is by grinding followed by manual application of repair material to obtain a repaired surface having a geometry and mechanical and thermal properties as close to the original as possible. The repaired area is typically made to have a larger thickness than the final one, so that the desired surface quality is obtained by removing excess material by grinding and polishing. Such a repair process is difficult to carry out, especially on surfaces having double curvature. The result of a repair process is therefore very dependent on the skills of the person carrying out the repair, and it is difficult to ensure that a desired quality is obtained.

Hence, an improved method of repairing a fibre composite solid member, such as a mould for manufacturing of wind turbine blades, would be advantageous, and in particular a more efficient and/or reliable repair method would be advantageous.

OBJECT OF THE INVENTION

It is an object of the present invention to provide a method of repairing a fibre composite solid member by which method the repair can be carried out more efficiently and thereby with a shorter downtime for maintenance than what is possible with presently known methods.

It is another object of the present invention to provide a method of repairing a fibre composite solid member by which method the result and quality of the repair is less dependent on the skills of the person carrying out the repair than what is the case with presently known methods.

It is another object of the present invention to provide a method of repairing a fibre composite solid member by which method it is easier than with presently known methods to ensure that the geometry and mechanical and thermal properties of a repaired surface are as close to those of the original surface as possible.

It is a further object of the present invention to provide an alternative to the prior art.

SUMMARY OF THE INVENTION

Thus, the above described object and several other objects are intended to be obtained in a first aspect of the invention by providing a method of repairing a fibre composite solid member having a locally deteriorated surface area, such as having cracks or creases, said method comprising the steps of machining a surface section comprising the locally deteriorated surface area in order to obtain a recess having a predefined depth and circumferential shape placing a repair patch having a predefined thickness and circumferential shape matching the recess in the recess, and fastening the repair patch to the solid member by use of a binder material, in which method elastic and thermal properties of the repair patch and the binder material are so that after fastening, the repair patch and the binder material in combination have elastic and thermal properties which are substantially the same as the corresponding properties of the surface section before machining.

It may be all or only some of the mechanical and thermal properties that are substantially the same. Differences which are insignificant for the use of the solid member would typically be acceptable.

The repair patch may be made by a method comprising applying a layer of coating on a moulding surface, said coating having substantially the same elastic and thermal properties as a coating layer of the solid member, placing one or more layers of reinforcing fibres on the layer of coating, impregnating the fibres with a resin by a vacuum assisted resin infusion process, applying heat to cure the repair patch, and machining the repair patch to the predefined circumferential shape.

The repair patch may alternatively be made by a method comprising applying a layer of coating on a moulding surface, said coating having substantially the same elastic and thermal properties as a coating layer of the solid member, placing one or more layers of resin-preimpregnated fibres on the layer of coating, applying vacuum and heat to lower the viscosity of the resin and to cure the repair patch, and machining the repair patch to the predefined circumferential shape.

A choice between the mentioned methods may typically depend on the manufacturing method used for the solid member to be repaired. It may be easiest to ensure the desired correspondence between mechanical and thermal properties before and after the repair, if the same type of manufacturing method is used.

The machining of the repair patch may comprise the use of a template with a circumferential shape matching the recess machined in the surface section.

Hereby it may be ensured that the repair patch obtains a desired shape without the need for automated machining methods, such as computer numerical control ("CNC") milling. Semi- or fully-automated machining methods are however also possible within the scope of the invention.

The repair patch may be fastened to the solid member by a vacuum assisted resin infusion process. By use of this method, the repair patch may be fastened by use of a resin corresponding to the resin used for the manufacture of the solid member. Hereby it may be easier to ensure that the mechanical and thermal properties are substantially constant also at the transition between the original material and the repair patch. This may lower the risk of cracks due to stress concentrations when the solid member is loaded and/or exposed to temperature changes.

One or more additional layers of reinforcing fibres may be placed under the repair patch in the recess before the repair patch is fastened. The additional layers of fibres preferably have a circumferential shape matching the recess. Such additional layers of reinforcing fibres may be used to control the flow of resin and to ensure a good binding between the repair patch and the recess over the whole of the relevant surface areas. They may also be used as a way of adjusting the thickness of pre-manufactured repair patches to a number of possible recess depths. This may decrease the necessary storage space for pre-manufactured repair patches, as they can be made in one or a few thicknesses. Since a repair patch is typically designed to have the desired surface properties including an outer coating layer matching the remainder of the surface to be repaired, the adjustment of the thickness is made by placing the additional layers of reinforcing fibres under the patch. Hereby the surface of the patch is kept at the same level as the surface of the repaired member.

The repair patch may alternatively be fastened to the solid member by gluing. Gluing is a relatively simple process, which means that the repair can be carried out more efficiently and thereby with a shorter downtime for maintenance than what is possible with presently known methods provided that the necessary repair patches are available as pre-manufactures. Another advantage is that the result and quality of the repair is less dependent on the skills of the person carrying out the actual repair than what is the case with presently known methods. By "actual repair" is meant that pre-manufactured repair patches may be used. The glue may e.g. be a hot melt used in combination with holding means and/or spacers to ensure that the final position of the patch is as desired.

The repair patch may by a further alternative be fastened to the solid member by a method comprising placing one or more layers of resin-preimpregnated fibres under the repair patch in the recess before the repair patch is fastened, said one or more layers of resin-preimpregnated fibres having a circumferential shape matching the recess, and applying vacuum and heat lower the viscosity of the resin and to cure the resin.

The number of layers of resin-preimpregnated fibres being placed under the repair patch is preferably chosen to ensure that the final height of the repaired area corresponds to the depth of the recess. Hereby an intact surface geometry is ensured without the need for adding or removing material afterwards.

It may be possible to make the repair patches to the predefined shape without the need for machining of the circumference. The method of manufacturing a repair patch comprising use of vacuum assisted resin infusion may be carried out with a closable mould having a non-flexible inner cavity into which the resin flows. Hereby the shape and size of the repair patch can be controlled. On the other hand, a larger number of moulds may be necessary. In the method of manufacturing a repair patch comprising use of layers of resin-preimpregnated fibres, the shape of the repair patch can be determined beforehand by machining the individual layers before use. This means that machining is not avoided, but it may be easier to machine individual layers than a manufactured repair patch.

A method of repairing a fibre composite solid member according to the present invention may be used for the repair of surface sections which are curved, such as having double curvature. The repair patch may have a curvature similar to the curvature of the corresponding surface section of the solid member. This may e.g. be obtained by the repair patch having been manufactured on a corresponding position on a plug which was used to model the solid member from. Manufacturing the repair patch in this way is particularly relevant for surfaces having large curvature or being double-curved, but it may be done for any curvature if desired.

The same methods may also be used for the repair of plane surfaces. The step of machining the surface section in order to obtain a recess may comprise the use of a CNC milling cutter. Hereby a method of repairing a fibre composite solid member is obtained by which method the result and quality of the repair is less dependent on the skills of the person carrying out the repair than what is the case with presently known methods in which hand-held tools are typically used.

The machining of the surface section in order to obtain a recess may comprise the use of a template with a through hole having a shape corresponding to the circumferential shape of the recess to be obtained by the machining. Hereby it may be ensured that the repair patch obtains a desired shape even without the need for automated machining methods, such as CNC milling.

In any of the methods described above, the depth of the recess may be at least 1 mm, such as 1 to 3 mm or 3 to 10 mm. The actual depth will depend on the size of the defects in the deteriorated surface, but it may be desirable to use a larger depth than necessary when judging from the size of the defects only. This is e.g. the case for relatively small defects where a thicker repair patch may be necessary to ensure a satisfactory and stable fastening of the repair patch. The actual choice of a depth may also have to be made to correspond to one of a limited number of available repair patch thicknesses. This may especially be the case for patches having a complex curvature, since it may not be desirable to manufacture and store these more complicated-to-produce patches in a large number of thicknesses.

The reinforcing fibres used in any of the above mentioned methods may be selected from the group consisting of glass fibres, carbon fibres, and aramid fibres. However, any type of fibres is possible within the scope of the invention. They will typically be chosen to match the fibres used in the solid member to be repaired as it may hereby be easier to ensure that elastic and thermal properties of the repair patch and the binder material are so that after fastening, the repair patch and the binder material in combination have elastic and thermal properties which are substantially the same as the corresponding properties of the surface section before machining.

The composite solid member to be repaired by a method according to the present invention may be a tool for manufacturing of wind turbine blades. It may alternatively be a wind turbine blade. The method may be used for repair of any fibre composite solid member, but it will typically mainly be used for solid members where it is important that elastic and thermal properties of the repair patch and the binder material are so that after fastening, the repair patch and the binder material in combination have elastic and thermal properties which are substantially the same as the corresponding properties of the surface section before machining.

BRIEF DESCRIPTION OF THE FIGURES

The method of repairing a fibre composite solid member according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1A:
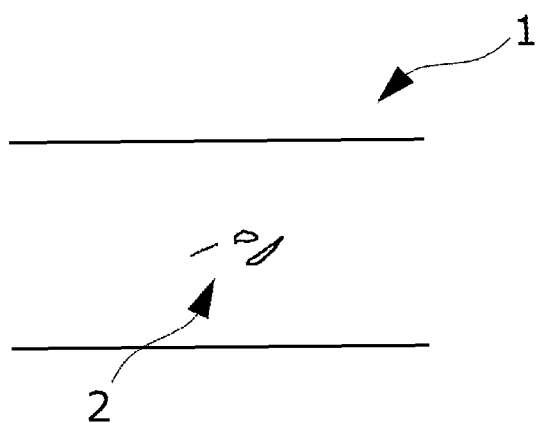
FIG. 1 shows schematically a three-dimensional view of the general idea of using a repair patch.
Figure 1B:
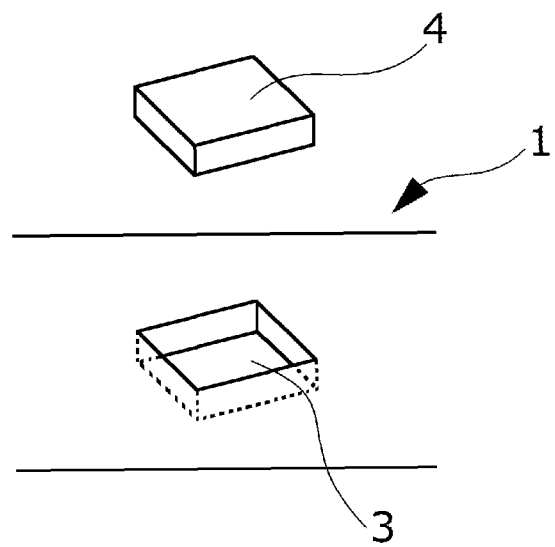
Figure 1C:
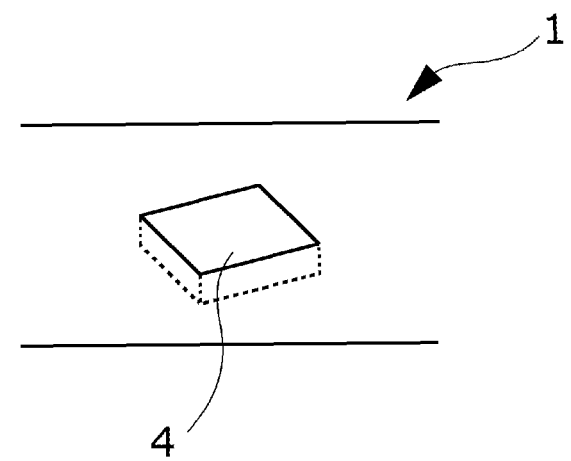

FIG. 1 shows schematically the overall idea of repairing a fibre composite solid member 1 having a locally deteriorated surface area 2; see FIG. 1a. The solid member could e.g. be a mould used in the manufacture of wind turbine blades or it could be a wind turbine blade. The deteriorated surface area 2 may e.g. have cracks or creases due to accidental impact. The repair typically only takes place in the outer finish layer which is not load-carrying. If the solid member 1 is a mould, the defects could also be due to small parts being torn off when a wind turbine blade is removed from the mould after manufacturing. FIG. 1b illustrates that a recess 3 has been made in the surface section comprising the locally deteriorated surface area 2. The recess 3 has a predefined depth and circumferential shape matching a repair patch 4 to be placed in the recess 3 in replacement of the removed material. FIG. 1c shows schematically a repaired surface section where the repair patch 4 has been placed in the recess 3 and fastened to the solid member 1. The surface may afterwards be exposed to further finishing processes, such as polishing and/or painting.

Figure 2:
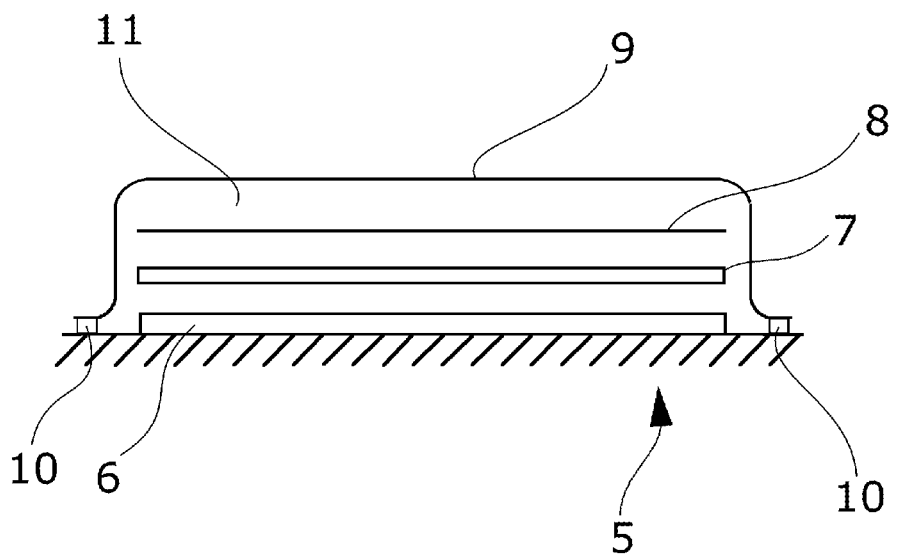
FIG. 2 shows schematically a cross sectional side view of a method of manufacturing a repair patch by use of a resin infusion technique.

FIG. 2 shows schematically an example of how a repair patch 4 can be manufactured by use of a resin infusion technique. When it is desired or necessary to obtain a repair patch 4 having a curvature similar to the one of the corresponding surface section of the solid member 1, the repair patch 4 may be manufactured on a corresponding position on the plug which was used to model the solid member 1 from. To this end, the "plug" is an exact replica of at least a portion of a finished item (e.g., the wind turbine blade) that is to be formed from the mould, and the "plug" is necessarily formed before the mould to define the shape of the mould when manufacturing the mould from the plug. However, for large parts of the solid member 1 the curvature is so small that a repair patch 4 is usable even if it was not made at exactly the same position as where it is to be used. As illustrated schematically in FIG. 2, a layer of coating 6 is applied on the plug which serves as moulding surface 5 for the repair patch 4. The layer of coating 6 is preferably the same material and has preferably the same thickness as what has been used for the manufacturing of the solid member 1. It may also be another material having substantially similar mechanical and thermal properties. One or more layers of reinforcing fibres 7 are placed on top of the layer of coating 6. A peel ply 8 is typically placed on top of the layer(s) of reinforcing fibres 7, and all the layers mentioned are covered by an airtight and flexible sheet 9, typically a plastic material, which is sealed to the moulding surface by use of sealing tape 10 to provide an enclosure 11 from which air can be evacuated via a vacuum port (not shown) by use of a vacuum pump (not shown). When substantially all the air present air in the enclosure 11 has been evacuated, resin (not shown) is supplied via an infusion port (not shown) and made to flow along the repair patch 4 by a vacuum assisted resin infusion process while filling up the empty spaces between the reinforcing fibres 7. When the empty spaces have been filled up, heat is applied and the repair patch 4 is left to cure for a predetermined period of time.

The repair patch 4 is then machined to the desired circumferential shape by any appropriate method which is known to a person skilled in the art. It may e.g. be by use of a milling cutter. The machining may comprise use of a template (not shown) with a circumferential shape matching the recess 3 to be machined in the surface section of the solid member 1. Alternatively, the repair patch 4 can be made in a closable mould (not shown) having a moulding cavity with rigid surfaces. Hereby it is possible to manufacture the repair patch 4 in its final shape by the vacuum assisted resin infusion process without the need for succeeding machining.

Figure 3:
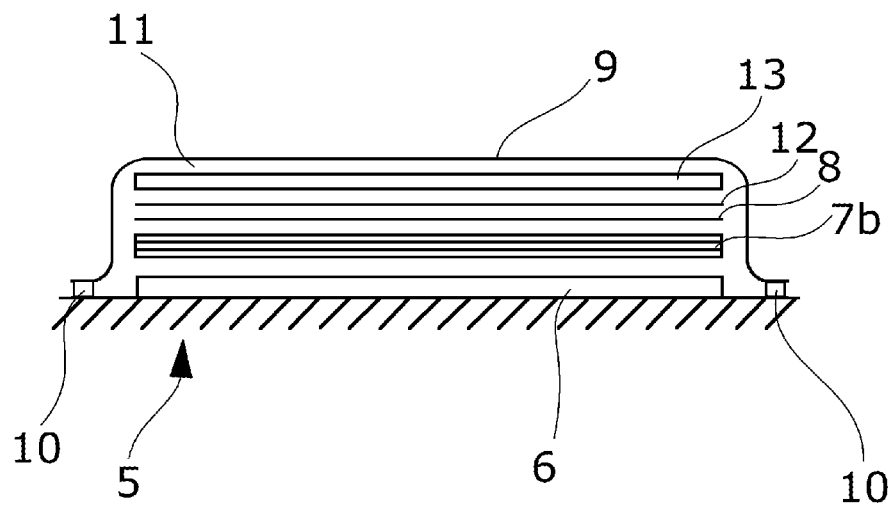
FIG. 3 shows schematically a cross sectional side view of a repair of a solid member wherein the manufacturing of the repair patch comprises use resin-preimpregnated fibres.

FIG. 3 shows schematically another method of manufacturing the repair patch 4, wherein it is made by use of layers of resin-preimpregnated fibres 7b; such layers are also known as pre-pregs. A predetermined number of pre-pregs 7b which are cut into the desired shape are placed on a moulding surface 5 to which a layer of coating 6 has been applied. A peel ply 8 is typically placed on top of the pre-pregs 7b to ensure that the surface of the manufactured repair patch 4 stays clean until a possible succeeding processing step. On top of the peel-ply 8 is a separation foil 12, which is typically a porous plastic foil, and a breather layer 13. As for the method described above, all the layers mentioned are covered by an airtight and flexible sheet 9 which is sealed to the moulding surface 5 by use of sealing tape 10 to provide an enclosure 11 from which air can be evacuated via a vacuum port (not shown) by use of a vacuum pump (not shown). When substantially all the air present air in the enclosure 11 has been evacuated, heat is applied for a predetermined period of time to cause a decrease in the viscosity of the preimpregnating resin. Due to the vacuum, the temperature increase results in a flow of resin in a direction substantially perpendicular to the pre-pregs 7b and towards the breather layer 13. A purpose of the breather layer 13 is to ensure that as much air as possible can be evacuated even if the flexible sheet 9 wrinkles. Some of the resin will flow into the breather layer 13, and another purpose of the breather layer 13 is therefore to take up the excess resin. A purpose of the separation foil 12 is to limit the flow of resin into the breather layer 13. A pressure may furthermore be applied in combination with the heat.

Figure 4:
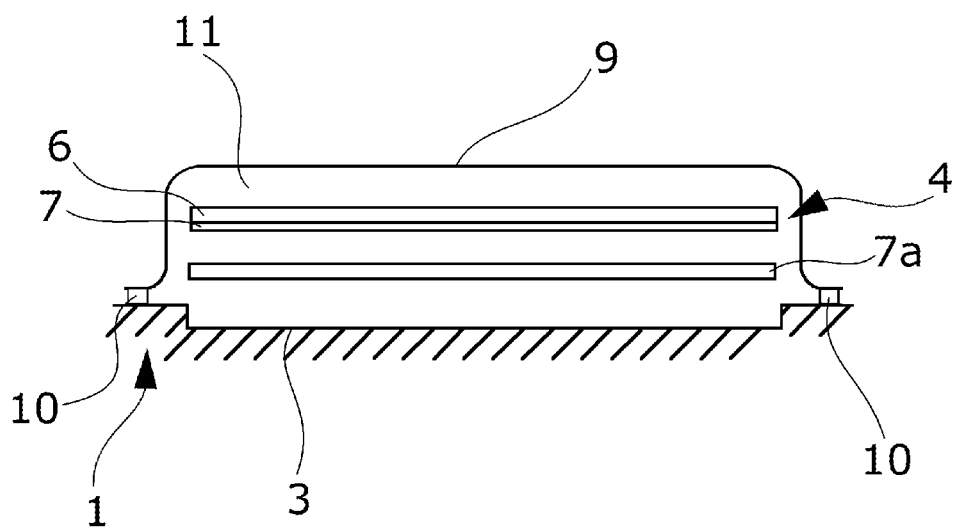
FIG. 4 shows schematically fastening of a repair patch by use of a resin infusion technique.

FIG. 4 shows schematically one way of fastening the repair patch 4 to the solid member 1. The peel ply 8 is removed before placing the repair patch 4 in the recess 3. One or more additional layers of reinforcing fibres 7a is placed under the repair patch 4 in the recess 3. This may also be used as a way of adapting repair patches 4 of a given thickness to recesses 3 of different depths. By arranging the additional layers 7a underneath the repair patch 4, it is ensured that the surface of the repair patch 4 is kept at the same level as the surface of the solid member 1, so that the desired surface properties, typically obtained by the choice of coating 6, is obtained. The additional one or more layer(s) of reinforcing fibres 7a preferably have substantially the same circumferential shape as the repair patch 4. The repair patch 4 is fixed in place e.g. by use of tape (not shown) and covered by an airtight and flexible sheet 9 which is sealed to the solid member 1 to provide an enclosure from which air can be evacuated in the same way as described above. Resin (not shown) is then supplied typically to one side of the repair patch 4 and the additional layers of reinforcing fibres 7a via an infusion port (not shown) and made to flow along and underneath the repair patch 4 by a vacuum assisted resin infusion process while filling up the empty spaces between the reinforcing fibres 7,7a and around the circumference of the repair patch 4. When the empty spaces have been filled up, the whole assembly is left to cure at elevated temperature whereby the repair patch 4 has been fastened to the solid member 1.

Figure 5:
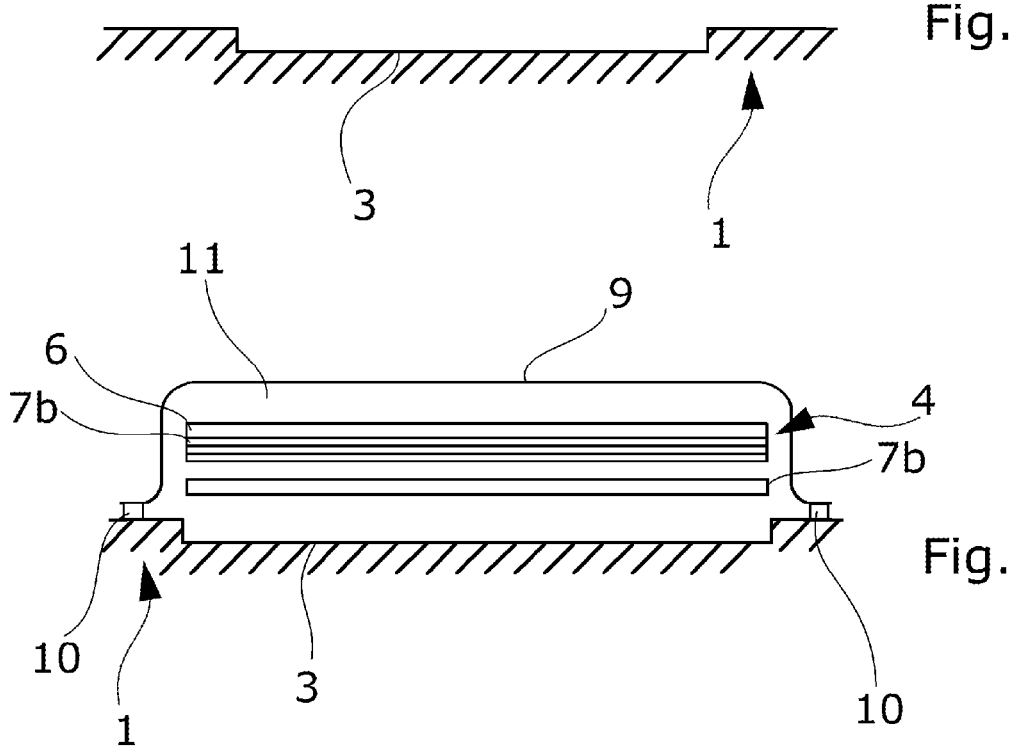
FIG. 5 shows schematically fastening of a repair patch by gluing.

FIG. 5 shows schematically that the repair patch 4 can be fastened by gluing. The glue (not shown) is applied to the surface of the recess 3, and the repair patch 4 is placed therein. The glue may e.g. be a hot melt so that the process comprises application of heat during the curing of the glue. The gluing process typically comprises use of holding means and/or spacers to ensure the desired position of the repair patch 4 after fastening.

Figure 6:
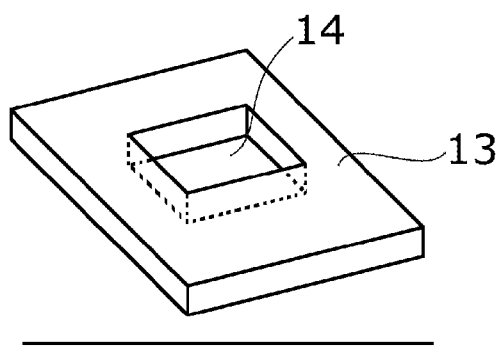
FIG. 6 shows schematically fastening of a repair patch by use of resin-preimpregnated fibres.

FIG. 6 shows schematically a repair patch 4 being fastened to the solid member 1 by use of resin-preimpregnated fibres 7b. The repair patch fastened by this method has typically also been manufactured by use of resin-preimpregnated fibres 7b, but it may also have been manufactured by use of a vacuum assisted resin infusion process. The method resembles what was described above for the manufacturing of the repair patch 4 by use of resin-preimpregnated fibres 7b except that it does not comprise the use of peel ply, separation foil and breather layer. In the fastening process, the excess resin is to fill up the circumferential gap between the recess 3 and the repair patch 4 to provide a fastening of the repair patch 4.

Figure 7:
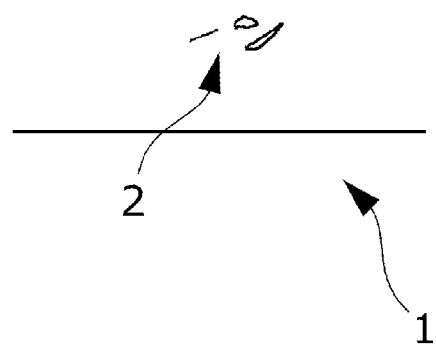
FIG. 7 shows schematically a repair method according to the present invention wherein a template is used in the machining of a surface section to obtain a recess in which the repair patch is to be placed.

The repair of a fibre composite solid member according to the present invention comprises the establishment of the recess 3 in the locally deteriorated surface. This is preferably done by machining using a computer numerical control ("CNC") milling cutter programmed to remove material to obtain a recess 3 having a predefined depth and circumferential shape while taking the curvature of the surface into account. Alternatively, the machining may comprise the use of a template 13 with a hole 14 corresponding to the shape of the recess 3, which template 13 is placed on top of the surface to be machined as illustrated schematically in FIG. 7. The template 13 may be non-flexible and have a curvature corresponding to the curvature of the surface to be machined. The figure illustrates repair of plane surfaces and therefore also a plane template 13. Alternatively (not shown) it may be made from a flexible material, such as silicone rubber, comprising holding means to hold the template towards the surface of the solid member. Such means may comprise simple clamps, or they may comprise means for holding the template by use of vacuum.

In order to minimize the downtime for maintenance, repair patches having a number of predetermined sizes and shapes may typically be pre-manufactured and ready for use when needed. As described above, the thickness of the repair patch may be adjusted by additional layers being arranged under the repair patch before fastening. Hereby it may only be necessary to have pre-manufactured repair patches in a few number of thicknesses.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of repairing a fibre composite solid member having a locally deteriorated surface area, the solid member including one of a wind turbine blade or a mould used to form the wind turbine blade, and the method comprising:

machining a surface section comprising the locally deteriorated surface area in order to obtain a recess having a predefined depth and circumferential shape placing a repair patch having a predefined thickness and circumferential shape matching the recess in the recess, and fastening the repair patch to the solid member by use of a binder material, such that the repair patch remains in the recess, in which method elastic and thermal properties of the repair patch and the binder material are so that after fastening, the repair patch and the binder material in combination have elastic and thermal properties which are substantially the same as the corresponding properties of the surface section before machining, and manufacturing the repair patch on a corresponding position on a plug which was used to model the solid member from, the plug defining a replica of at least a portion of the wind turbine blade and having the shape, dimensions, and surface finish of the at least a portion of the wind turbine blade, the plug having been manufactured before using the plug to form the mould.

2. The method according to claim 1, wherein the repair patch is made by a method comprising:

applying a layer of coating on a moulding surface, said coating having substantially the same elastic and thermal properties as a coating layer already existing on the solid member, placing one or more layers of reinforcing fibres on the layer of coating, impregnating the fibres with a resin by a vacuum assisted resin infusion process, applying heat to cure the repair patch, and machining the repair patch to the predefined circumferential shape.

3. The method according to claim 1, wherein the repair patch is made by a method comprising:

applying a layer of coating on a moulding surface, said coating having substantially the same elastic and thermal properties as a coating layer already existing on the solid member, placing one or more layers of resin-preimpregnated fibres on the layer of coating, applying vacuum and heat to lower the viscosity of the resin and to cure the repair patch, and machining the repair patch to the predefined circumferential shape.

4. The method according to claim 2, wherein the machining of the repair patch comprises the use of a template with a circumferential shape matching the recess machined in the surface section.

5. The method according to claim 1, wherein the repair patch is fastened to the solid member by a vacuum assisted resin infusion process.

6. The method according to claim 5, wherein one or more additional layers of reinforcing fibres is placed under the repair patch in the recess before the repair patch is fastened, said additional layers of fibres having a circumferential shape matching the recess.

7. The method according to claim 1, wherein the repair patch is fastened to the solid member by gluing.

8. The method according to claim 1, wherein the repair patch is fastened to the solid member by a method comprising:
- placing one or more layers of resin-preimpregnated fibres under the repair patch in the recess before the repair patch is fastened, said one or more layers of resin-preimpregnated fibres having a circumferential shape matching the recess, and
- applying vacuum and heat lower the viscosity of the resin and to cure the resin.

9. The method according to claim 1, wherein the surface section is curved.

10. The method according to claim 9, wherein the repair patch has a curvature similar to the curvature of the corresponding surface section of the solid member.

11. The method according to claim 1, wherein the surface section is machined by use of a computer numerical control milling cutter.

12. The method according to claim 1, wherein the machining of the surface section comprises the use of a template with a through hole having a shape corresponding to the circumferential shape of the recess to be obtained by the machining.

13. The method according to claim 1, wherein the depth of the recess is at least 1 mm.

14. The method according to claim 2, wherein the reinforcing fibres are selected from the group consisting of glass fibres, carbon fibres, and aramid fibres.

15. The method according to claim 1, wherein the composite solid member is a tool for manufacturing of wind turbine blades.

16. The method according to claim 1, wherein the composite solid member is a wind turbine blade.

17. A method according to claim 3, wherein the machining of the repair patch comprises the use of a template with a circumferential shape matching the recess machined in the surface section.

18. The method according to claim 1, wherein the plug defines a replica of the wind turbine blade, the replica being defined by having the shape, dimensions, and surface finish of the wind turbine blade.

19. The method according to claim 1, wherein the step of manufacturing the repair patch on the plug is performed before the step of placing the repair patch in the recess.

* * * * *

UNITED STATES PATENT AND TRADEMARK OFFICE
CERTIFICATE OF CORRECTION

| | | |
|---|---|---|
| PATENT NO. | : 8,747,592 B2 | Page 1 of 1 |
| APPLICATION NO. | : 12/809760 | |
| DATED | : June 10, 2014 | |
| INVENTOR(S) | : Knud Nielsen Stenbaek et al. | |

It is certified that error appears in the above-identified patent and that said Letters Patent is hereby corrected as shown below:

In the Specification:

Col. 1, line 51 reads: "...and quality of the repair is less dependent on..."
Replace with: "...and quality of the repair are less dependent on..."

Col. 3, line 37 reads: "...applying vacuum and heat lower the viscosity of the resin and to cure the resin."
Replace with: "...applying vacuum and heat to lower the viscosity of the resin and to cure the resin."

Col. 4, lines 61-62 read: "The figures show one way of...and is..."
Replace with: "The figures show one way of...and are..."

Col. 5, lines 5-6 read: "...the manufacturing of the repair patch comprises use resin-preimpregnated fibres,"
Replace with: "...the manufacturing of the repair patch comprises using resin-preimpregnated fibres,"

Col. 6, lines 2-3 read: "...all the air present air in the enclosure..."
Replace with: "...all the air present in the enclosure..."

Signed and Sealed this
Fifth Day of January, 2016

Michelle K. Lee
*Director of the United States Patent and Trademark Office*